(12) United States Patent
Shi et al.

(10) Patent No.: US 12,342,339 B2
(45) Date of Patent: Jun. 24, 2025

(54) COMMUNICATION METHOD AND COMMUNICATION APPARATUS

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Yun Fang, Dongguan (CN); Yingpei Huang, Dongguan (CN); Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 518 days.

(21) Appl. No.: 17/731,150

(22) Filed: Apr. 27, 2022

(65) Prior Publication Data
US 2022/0256574 A1   Aug. 11, 2022

Related U.S. Application Data

(63) Continuation of application No. PCT/CN2019/116826, filed on Nov. 8, 2019.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01);
(Continued)

(58) Field of Classification Search
CPC ........... H04W 72/1273; H04W 72/542; H04W 72/23; H04W 72/044; H04L 1/1812; H04L 5/0053
See application file for complete search history.

(56) References Cited

U.S. PATENT DOCUMENTS

2019/0174466 A1* 6/2019 Zhang ................ H04L 5/0057
2020/0154467 A1   5/2020 Gong et al.
(Continued)

FOREIGN PATENT DOCUMENTS

CN        110391890 A     10/2019
EP        3547781 A1      10/2019
(Continued)

OTHER PUBLICATIONS

First Office Action issued in corresponding Chinese application No. 202210335530.6, mailed Jun. 2, 2023.
(Continued)

*Primary Examiner* — Saad A. Waqas
(74) *Attorney, Agent, or Firm* — BAYES PLLC

(57) ABSTRACT

Embodiments of the present application disclose a communication method, comprising: receiving first configuration information for configuring one or more CORESETs, wherein at least one of the one or more CORESETs is configured with a corresponding group index, and the one or more CORESETs do not include CORESET #0; determining a group index of CORESET #0; and receiving, according to scheduling information transmitted over CORESET #0 and/or scheduling information transmitted over the one or more CORESETs, PDSCHs scheduled by means of the scheduling information. The terminal device determines the group index of CORESET #0 and/or the group index of the one or more CORESETs, such that the group indexes can be used to distinguish between scheduling information transmitted over different CORESETs, thereby enabling receipt of PDSCHs scheduled by means of the scheduling information transmitted over the different CORESETs, and achieving a multi-PDCCH-based transmission solution.

16 Claims, 3 Drawing Sheets

(51) Int. Cl.
*H04L 5/00* (2006.01)
*H04W 72/044* (2023.01)
*H04W 72/23* (2023.01)
*H04W 72/542* (2023.01)

(52) U.S. Cl.
CPC ......... *H04W 72/044* (2013.01); *H04W 72/23* (2023.01); *H04W 72/542* (2023.01)

(56) References Cited

U.S. PATENT DOCUMENTS

| | | | | |
|---|---|---|---|---|
| 2021/0014026 | A1* | 1/2021 | Papasakellariou | H04L 1/1861 |
| 2021/0022144 | A1 | 1/2021 | Shi et al. | |
| 2021/0044403 | A1* | 2/2021 | Zhang | H04L 5/0035 |
| 2021/0058805 | A1* | 2/2021 | Ji | H04W 24/04 |
| 2022/0393829 | A1* | 12/2022 | Kim | H04L 1/18 |

FOREIGN PATENT DOCUMENTS

| | | | | |
|---|---|---|---|---|
| EP | 3565172 | A1 | 11/2019 | |
| EP | 3565172 | B1 * | 11/2020 | H04L 5/0023 |
| IN | 201914000620 | A | 7/2019 | |
| WO | 2019192715 | A1 | 10/2019 | |
| WO | 2019201250 | A1 | 10/2019 | |
| WO | WO-2021062973 | A1 * | 4/2021 | H04B 7/0695 |

OTHER PUBLICATIONS

Vivo, "Remaining issues on QCL", R1-1803827, 3GPP TSG RAN WG1 Meeting #92bis Sanya, China, Apr. 16-20, 2018.
Nokia et al., "On UE features 3-1, 5-1, 5-1a, 6-1, 6-2 and capability to FDM slot and mini-slot", R1-1807282, 3GPP TSG RAN WG1 Meeting #93 Busan, South Korea, May 21-25, 2018.
Qualcomm Incorporated, "Beam management for NR", R1-1811633, 3GPP TSG-RAN WG1 Meeting #94bis Chengdu, China, Oct. 8-12, 2018.
Huang Chenheng, "Review on Physical Layer Key Technology of 3GPP 5G NR", Publisher: Mobile Communication, Release Date: Oct. 15, 2018.
Extended European Search Report issued in corresponding European application No. 19951921.6, mailed Sep. 27, 2022.
3GPP TS 38.331 V16.0.0 (Mar. 2020); Technical Specification Group Radio Access Network; NR; Radio Resource Control (RRC) protocol specification (Release 16).
Huawei et al., "Enhancements on Multi-TRP/panel transmission", R1-1903970, 3GPP TSG RAN WG1 Meeting #96bis Xi'an, China, Apr. 8-12, 2019.
International Search Report issued in corresponding International Application No. PCT/CN2019/116826, mailed Jul. 15, 2020, 40 pages.
PCT Written Opinion of the International Searching Authority issued in corresponding International Application No. PCT/CN2019/116826, mailed Jul. 15, 2020, 10 pages.
"TCI states configuration for CORESET#0", Agenda item: 10.4.1.3.1.1, Source: Nokia, Nokia Shanghai Bell, 3GPP TSG-RAN WG2 Meeting #103bis, R2-1814985, Chengdu, China, Oct. 8-12, 2018, 3 pages.
"CORESET Configuration for RMSI Scheduling", Agenda item: 5.1.1.2.4, Source: CMCC, 3GPP TSG RAN WG1 Meeting NR Ad-Hoc #2, R1-1710773, Qingdao, China Jun. 27-30, 2017, 4 pages.
First Office Action issued in corresponding European application No. 19951921.6, mailed Jul. 12, 2023.
Notice of Allowance issued in corresponding Chinese application No. 202210335530.6, mailed Aug. 16, 2023.
ZTE, "Enhancements on Multi-TRP and Multi-panel Transmission", R1-1910284, 3GPP TSG RAN WG1 #98bis Chongqing, China, Oct. 14-20, 2019.
Qualcomm Incorporated, "Multi-TRP Enhancements", R1-1909272, 3GPP TSG-RAN WG1 Meeting #98 Aug. 26-30, 2019 Prague, Czech Republic.
NTT Docomo, Inc., "Offline summary for PDCCH structure and search space", R1-1809766, 3GPP TSG RAN WG1 Meeting #94 Gothenburg, Sweden, Aug. 20-24, 2018.
Intel Corporation, "CR to 38.214 for CSI-RS (TRS, CSI, IM)+ PDSCH multiplexing", R1-1812469, 3GPP TSG RAN WG1 Meeting #95 Spokane, USA, Nov. 12-16, 2018.
3GPP Draft; List of RAN1 Agreements in RAN1#92BIS 93_V1, 3rd Generation Partnership Project (3GPP), Mobile Competence Centre ; 650, Route Des Lucioles ; F-06921 Sophia-Antipolis Cedex ; France vol. RAN WG1, No. ; Apr. 1, 2018 Jun. 7, 2018 (Jun. 7, 2018), XP051455919.

* cited by examiner

COMMUNICATION METHOD AND COMMUNICATION APPARATUS

CROSS-REFERENCE TO RELATED APPLICATION

This application is a continuation of International Application No. PCT/CN2019/116826 filed on Nov. 8, 2019, the entire content of which is incorporated herein by reference in its entirety.

TECHNICAL FIELD

The present disclosure relates to the field of communications, and in particular to a communication method and a communication apparatus.

BACKGROUND

Fifth generation (5G) mobile communication systems support high-band communications. When an operating frequency becomes higher, path loss during transmission may increase, resulting in a decrease in signal coverage. A solution to the above-mentioned problem is to adopt multiple-beam transmission on the basis of a large-scale antenna array, so as to increase the signal coverage.

One of multiple-beam transmission schemes is multiple-physical downlink control channel (PDCCH) based scheme (multiple-PDCCH based scheme). According to this scheme, multiple transmission/reception points (TRPs) or multiple antenna panels or multiple beams simultaneously transmit downlink data to a terminal device. In order to distinguish PDCCHs corresponding to different TRPs, it is necessary to configure an index for a control resource set (CORESET) corresponding to each TRP. Such index may be called a group index, or may be called another name. Group indexes of different CORESETs may be the same or different.

For example, multiple CORESETs with the same group index may be referred to as one CORESET group.

CORESET #0 is a special CORESET. At present, it is impossible to simultaneously configure a group index for CORESET #0 and group indexes for other CORESETs through a single radio resource control (RRC) signaling. However, the multiple-PDCCH based transmission scheme has many transmission processes related to the group index. How to use CORESET #0 in the multiple-PDCCH based transmission scheme is a problem that needs to be solved at present.

SUMMARY

The present disclosure provides a communication method, which may solve a problem of how to use CORESET #0 in a multiple-PDCCH based transmission scheme.

In a first aspect, there is provided a communication method, including: receiving first configuration information, wherein the first configuration information is used to configure one or more CORESETs, at least one of the one or more CORESETs is configured with a respective group index, and the one or more CORESETs do not include CORESET #0; determining a group index of CORESET #0; and receiving, according to scheduling information transmitted on the one or more CORESETs and/or CORESET #0, a PDSCH scheduled by the scheduling information.

Since the terminal device determines the group index of CORESET #0 and/or the group index of the one or more CORESETs, the group indexes may be used to distinguish between scheduling information transmitted on different CORESETs, thereby enabling to receive PDSCHs scheduled by the scheduling information transmitted on different CORESETs, and achieving the multiple-PDCCH based transmission scheme In a second aspect, there is provided another communication method, including: receiving first configuration information, wherein the first configuration information is used to configure one or more CORESETs, at least one of the one or more CORESETs is configured with a respective group index, and the one or more CORESETs do not include CORESET #0; and receiving, according to scheduling information transmitted on the one or more CORESETs and/or CORESET #0, a physical downlink shared channel (PDSCH) scheduled by the scheduling information.

In a third aspect, there is provided a communication apparatus. The communication apparatus may implement the functions corresponding to the method in the first aspect or the second aspect. The functions may be implemented by hardware or respective software executed by hardware. The hardware or software includes one or more units or modules corresponding to the above functions.

In a possible scheme, the apparatus is a terminal device or a chip. The apparatus may include a processing unit and a transceiving unit. When the apparatus is a terminal device, the processing unit may be a processor and the transceiving unit may be a transceiver. The terminal device may further include a storage unit, which may be a memory. The storage unit is configured to store instructions, and the processing unit executes the instructions stored in the storage unit, enabling the terminal device to perform the method described in the first aspect or the second aspect. When the apparatus is a chip in the terminal device, the processing unit may be a processor, and the transceiving unit may be an input/output interface, pin or circuit, etc. The processing unit executes instructions stored in the storage unit, enabling the terminal device containing the chip to perform the method described in the first aspect or the second aspect. The storage unit may be a storage unit in the chip (such as a register, a cache, etc.) or a storage unit outside the chip in the terminal device (such as a read-only memory, a random access memory, etc.).

In a fourth aspect, there is provided a computer readable storage medium. A computer program is stored in the computer readable storage medium. When the computer program is executed by a processor, the processor is enabled to perform the method described in the first aspect or the second aspect.

In a fifth aspect, there is provided a computer program product, which includes computer program codes. When the computer program codes are executed by a processor, the processor is enabled to perform the method described in the first aspect or the second aspect.

In a sixth aspect, there is provided a computer program. When the computer program is run on a computer, the computer is enabled to perform the method described in the first aspect or the second aspect.

DETAILED DESCRIPTION

The technical solutions in embodiments of the present disclosure will be described below with reference to the accompanying drawings in embodiments of the present disclosure. Obviously, only a part of the embodiments, not all the embodiments of the present disclosure, are described. All other embodiments obtained, based on the embodiments described in the present disclosure, by those skilled in the art without paying creative efforts shall fall within the protection scope of the present disclosure.

Figure 1:
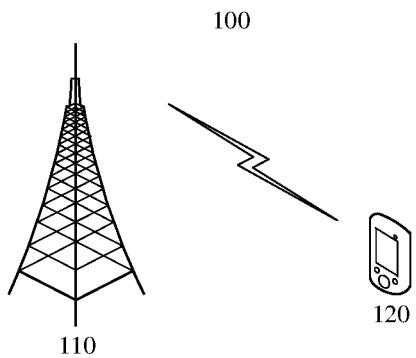
FIG. 1 is a schematic diagram of a communication system suitable for the present disclosure.

First of all, an application scenario of the present disclosure is introduced. FIG. 1 is a schematic diagram of a communication system to which the present disclosure is applied.

A communication system 100 includes a network device 110 and a terminal device 120. The terminal device 120 may communicate with the network device 110 through electromagnetic waves.

According to some embodiments of the present disclosure, the terminal device 120 may include various devices having wireless communication functions, such as handheld devices, vehicle-mounted devices, wearable devices, computing devices, or other processing devices connected to a wireless modem.

For example, the terminal device 120 may be a user equipment (UE), mobile station (MS), soft terminal, home gateway, set-top box, etc., defined by the third generation partnership project (3GPP).

The network device 110 may be a base station defined by 3GPP, for example, a base station (gNB) and/or a core network device in a 5G communication system. The network device 110 may also be a non-3GPP access network device, such as an access gateway (AGF). The network device 110 may also be a relay station, an access point, a vehicle-mounted device, a wearable device, and other types of devices.

The communication system 100 is only representative of an example, and the communication systems applicable to the present disclosure are not limited only to it. The number of network devices and terminal devices included in the communication system 100 may also be other numbers.

When receiving a signal, the terminal device may utilize transmission environment characteristics of data transmission to improve a reception algorithm, in order to improve reception performances.

For example, the terminal device may use statistical characteristics of a channel to optimize scheme and parameters of a channel estimator. In the 5G mobile communication systems, the transmission environment characteristics are implicitly expressed through a quasi co-location (QCL) state (also referred to as QCL-Info).

If downlink transmissions come from different TRPs or different antenna panels or different beams, transmission environment characteristics of the downlink transmissions may also change. Therefore, when the network device transmits a downlink control channel or a data channel, it may indicate QCL state information to the terminal device through a transmission configuration indicator (TCI) state.

The TCI state may include the following contents: TCI state identifier (ID) for identifying a TCI state; QCL information 1; and QCL information 2 (which is optional).

QCL information may include the following contents: QCL type configuration, which may be one of QCL type A, QCL type B, QCL type C, and QCL type D; and QCL reference signal configuration, including a cell ID of a cell where a reference signal is located, a bandwidth part (BWP) ID of a BWP where the reference signal is located, and a reference signal ID, which reference signal ID may be a channel state information-reference signal (CSI-RS) resource ID or a synchronization signal block (SSB) (also referred to as physical broadcast channel block) index.

If the QCL information 1 and the QCL information 2 are both configured, at least one of the QCL information 1 and the QCL information 2 should be configured in one of QCL type A, QCL type B, and QCL type C, and the other QCL information should be configured in QCL type D.

Different QCL types are defined as follows.
QCL-TypeA: Doppler shift, Doppler spread, average delay, and delay spread.
QCL-TypeB: Doppler shift and Doppler spread.
QCL-TypeC: Doppler shift and average delay.
QCL-TypeD: Spatial reception parameter (i.e., Spatial Rx parameter).

If the network device configures a QCL reference signal of a downlink channel or a downlink signal as the SSB or CSI-RS resource through the TCI state, and the QCL type is configured as Type A, Type B, or Type C, the terminal may assume that the downlink signal has the same large-scale parameter as the SSB or CSI-RS resource, and the large-scale parameter is determined according to the QCL type.

Similarly, if the network device configures the QCL reference signal of the downlink channel or the downlink signal as the SSB or CSI-RS resource through the TCI state, and the QCL type is configured as Type D, the terminal may use the same reception beam (in other words, the same spatial Rx parameter) as the reception beam that receives the SSB or CSI-RS resource to receive the downlink signal. Generally, the downlink channel (or the downlink signal) and the SSB or CSI-RS resource thereof are transmitted by the same TRP or the same antenna panel, but different beams at the network device side, and the network device is usually configured with different TCI states.

For a downlink control channel, the TCI state of the CORESET corresponding to the downlink control channel may be indicated through the RRC signaling or through the RRC signaling and media access control (MAC) signaling.

Figure 2:
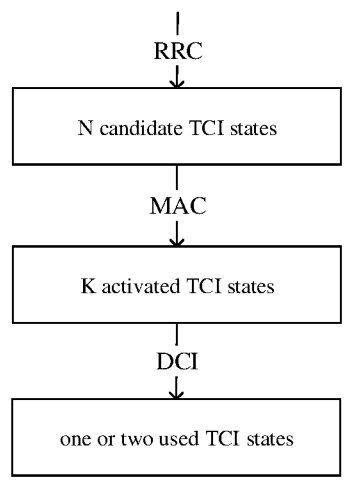
FIG. 2 is a schematic diagram for indicating a TCI state according to an embodiment of the present disclosure.

For a downlink data channel, a set of available TCI states is indicated through the RRC signaling, and some TCI states in the set are activated through the MAC signaling. Finally, one or two TCI states are indicated from the activated TCI states through a TCI state indication field in downlink control information (DCI), and used for a physical downlink shared channel (PDSCH) scheduled by the DCI. The above processes are shown in FIG. 2.

According to some embodiments of the present disclosure, a multiple-PDCCH transmission scheme may also be referred to as a multiple-DCI transmission scheme. The two ways of description are common to each other.

In the following, a CORESET-based communication method according to some embodiments of the present disclosure will be introduced in detail.

Figure 3:
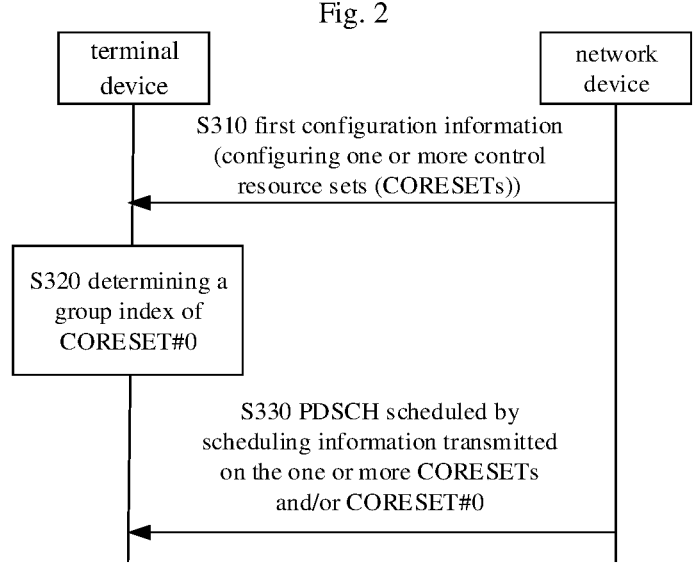
FIG. 3 is a schematic diagram of a communication method according to an embodiment of the present disclosure.

As shown in FIG. 3, the method includes the following steps S310, S320, and S330.

In S310, a terminal device receives first configuration information. The first configuration information is used to configure one or more CORESETs, at least one of the one or more CORESETs is configured with a respective group index, and the one or more CORESETs do not include CORESET #0.

The first configuration information is, for example, information carried in PDCCH-config signaling. A network device may configure at most 5 CORESETs for the terminal device. The network device may also configure group indexes of the one or more CORESETs that do not include CORESET #0 for the terminal device through RRC signaling or a MAC control element (CE). For the ease of description, the one or more CORESETs that do not include CORESET #0 are referred to as other CORESETs below.

For example, the network device configures three CORESETs for the terminal device, namely CORESET #1, CORESET #2, and CORESET #3. The network device may use the parameter of ControlResourceSet in the RRC signaling to configure group indexes for these three CORESETs. Alternatively, the network device may use the parameter of ControlResourceSet in the RRC signaling to configure group indexes for one or two of the three CORESETs. Group indexes of different CORESETs may be the same or different.

The group index may be an identifier of a CORESET group to simplify signaling configuration. The CORESETs in the same CORESET group correspond to the same group index.

The group index may be 0 or 1. If some CORESETs are configured with the group index, and other CORESETs are not configured with the group index, the network device and terminal device may consider the group index of the other CORESETs as a default value by default. Optionally, the default value may be the largest group index or the smallest group index.

For example, if the network device configures three CORESETs for the terminal device, namely CORESET #1, CORESET #2, and CORESET #3, and the network device configures the group index 1 for CORESET #1, the terminal device and the network device may consider the group indexes of CORESET #2 and CORESET #3 as 0 by default.

The CORESETs configured with the same group index may be called a CORESET group. For example, the CORESETs corresponding to the group index 0 form a CORESET group, and the CORESETs corresponding to the group index 1 form another CORESET group.

In S320, the terminal device determines a group index of CORESET #0.

The group index of CORESET #0 may be a fixed index, for example, an index specified by a protocol, or a preset index. In this way, the terminal device may determine the group index of CORESET #0 without receiving configuration information from the network device, thereby reducing complexity of the communication system.

When the group index of CORESET #0 is a fixed index, the group index of CORESET #0 may be the smallest group index, such as 0. Alternatively, the group index of CORESET #0 may also be the largest group index, such as 1.

The terminal device may also determine the group index of CORESET #0 according to second configuration information sent by the network device, thereby improving flexibility of the communication system and facilitating the network device to optimize the communication performance.

The second configuration information may be carried in first RRC signaling, and the first RRC signaling is, for example, search space configuration signaling corresponding to CORESET #0.

The second configuration information may also be carried in MAC CE or first DCI. When the second configuration information is carried in the first DCI, the second configuration information may be carried in scrambling information of second DCI.

When the terminal device does not receive the configuration information, the terminal device may determine that the group index of CORESET #0 is the above-mentioned fixed group index.

After determining the group index of CORESET #0 and the group indexes of other CORESETs, the terminal may perform the following step S330.

In S330, according to scheduling information transmitted on the one or more CORESETs and/or CORESET #0, a PDSCH scheduled by the scheduling information is received.

Since the terminal device has determined the group index of CORESET #0 and/or the group index of the one or more CORESETs, the group indexes may be used to distinguish between scheduling information transmitted on different CORESETs, thereby enabling to receive PDSCHs scheduled by the scheduling information transmitted on different CORESETs, and achieving the multiple-PDCCH based transmission scheme.

According to an optional embodiment, the terminal device may receive second DCI on CORESET #0. The second DCI is used to schedule a first PDSCH, and the second DCI is the scheduling information transmitted on CORESET #0.

When the second DCI meets a first preset condition, and the second DCI and the first PDSCH correspond to the same component carrier (CC), the terminal device receives the first PDSCH according to a TCI state or a QCL assumption of a first CORESET.

When the second DCI meets the first preset condition, and the second DCI and the first PDSCH correspond to different CCs, the terminal device receives the first PDSCH according to a first TCI state or a first QCL assumption.

The first preset condition indicates that the second DCI does not include a TCI state indication field, or that a time interval between the second DCI and the first PDSCH is less than a first threshold or less than or equal to the first threshold.

The first CORESET comprises: a CORESET with the smallest ID among at least one CORESET within the most recently detected downlink slot on a BWP corresponding to the second DCI; or a CORESET with the smallest ID among the at least one CORESET, corresponding to the group index of CORESET #0, within the most recently detected downlink slot on the BWP corresponding to the second DCI.

The TCI state of the first CORESET may be an activated TCI state of the first CORESET.

The first TCI state comprises: a TCI state with the smallest ID among activated TCI states corresponding to PDSCHs on a BWP where the first PDSCH is located; or a TCI state with the smallest ID among activated TCI states, corresponding to the group index of CORESET #0, on the BWP where the first PDSCH is located; or an activated TCI state corresponding to a CORESET with the smallest ID among at least one CORESET on the BWP where the first PDSCH is located.

The first QCL assumption is a QCL assumption corresponding to the CORESET with the smallest ID among the at least one CORESET on the BWP where the first PDSCH is located.

The above solution adopts different schemes for cross-carrier scheduling and non-cross-carrier scheduling, which improves the system flexibility.

According to an optional embodiment, the terminal device may receive third DCI on CORESET #0. The third DCI is used to schedule a first CSI-RS and the third DCI is the scheduling information transmitted on CORESET #0.

When the third DCI meets a second preset condition, and the third DCI and the first CSI-RS correspond to the same CC, the first CSI-RS is received according to a TCI state or a QCL assumption of a second CORESET.

Alternatively, when the third DCI meets the second preset condition, and the third DCI and the first CSI-RS correspond to different CCs, the first CSI-RS is received according to a second TCI state or a second QCL assumption.

The second preset condition indicates that a time interval between the third DCI and the first CSI-RS is less than a first threshold or less than or equal to the first threshold.

The second CORESET comprises: a CORESET with the smallest ID among CORESETs within the most recently detected downlink slot on a BWP corresponding to the third DCI; or a CORESET with the smallest ID among CORESETs, corresponding to the group index of CORESET #0, within the most recently detected downlink slot on a BWP corresponding to the third DCI.

The TCI state of the second CORESET may be an activated TCI state of the second CORESET.

The second TCI state comprises: a TCI state with the smallest ID among activated TCI states corresponding to PDSCHs on a BWP where the first CSI-RS is located; or a TCI state with the smallest ID among activated TCI states, corresponding to the group index of CORESET #0, on the BWP where the first CSI-RS is located; or an activated TCI state corresponding to a CORESET with the smallest ID among CORESETs on the BWP where the first CSI-RS is located.

The second QCL assumption may be a QCL assumption corresponding to the CORESET with the smallest ID among the CORESETs on the BWP where the first CSI-RS is located.

The above solution adopts different schemes for cross-carrier scheduling and non-cross-carrier scheduling, which improves the system flexibility.

In some embodiments, the first threshold may be configured by the network device, or specified by the protocol, or reported by the terminal device.

When the terminal device reports the first threshold, the terminal device may report the first threshold through parameters of timeDurationForQCL (corresponding to PDSCH) and/or beamSwitchTiming (corresponding to CSI-RS). The parameters of timeDurationForQCL and/or beamSwitchTiming include first thresholds corresponding to one or more bands. Alternatively, the parameters of timeDurationForQCL and/or beamSwitchTiming include first thresholds corresponding to one or more band combinations. The terminal device reports its own capability, such that the network device determines the first threshold suitable for the terminal device based on the capability of the terminal device. Thus, the multiple-PDCCH based transmission scheme can support terminal devices with different capabilities.

According to an optional embodiment, the terminal device may receive fourth DCI on CORESET #0. The fourth DCI is used to schedule a second PDSCH, and a scrambling ID of the second PDSCH is a PDSCH scrambling ID corresponding to the group index of CORESET #0. The fourth DCI is the scheduling information transmitted on CORESET #0. Optionally, the fourth DCI and the second DCI described above may be the same DCI or different DCIs. Besides, the second PDSCH and the first PDSCH may be the same PDSCH or different PDSCHs.

The PDSCH scrambling ID is one of at least one scrambling ID configured by second RRC signaling. The second RRC signaling may be dataScramblingIdentityPDSCH and/or AdditionalDataScramblingIdentityPDSCH. The fourth DCI may be in DCI format 1-1, or in DCI format 1-0 transmitted in a user equipment (UE) specific search space.

The above solution helps to randomize the interference between PDSCHs sent by different TRPs, and improve the communication performance.

According to an optional embodiment, the terminal device may receive fifth DCI on CORESET #0. The fifth DCI is used to schedule a first physical uplink shared channel (PUSCH), and a scrambling ID of the first PUSCH is a PUSCH scrambling ID corresponding to the group index of CORESET #0. The fifth DCI is the scheduling information transmitted on CORESET #0.

The PUSCH scrambling ID corresponding to the group index of CORESET #0 may be one of at least one scrambling ID configured by third RRC signaling. The third RRC signaling may be dataScramblingIdentityPUSCH and/or AdditionalDataScramblingIdentityPUSCH. The fifth DCI may be in a DCI format 0-1, or in a DCI format 0-0 transmitted in the UE specific search space.

The above solution helps to randomize the interference between uplink data and improve the communication performance.

According to an optional embodiment, the terminal device may receive sixth DCI on CORESET #0. The PDCCH scrambling ID corresponding to the sixth DCI is a PDCCH scrambling ID corresponding to the group index of CORESET #0. The sixth DCI is the scheduling information transmitted on CORESET #0.

The PDCCH scrambling ID corresponding to the group index of CORESET #0 may be one of at least one scrambling ID configured by fourth RRC signaling. The fourth RRC signaling may be pdcch-DMRS-ScramblingID and/or Addtionalpdcch-DMRS-ScramblingID. The sixth DCI is, for example, DCI transmitted in the UE specific search space.

The above solution helps to randomize the interference between PDCCHs sent by different TRPs, and improve the communication performance.

According to an optional embodiment, the terminal device may receive seventh DCI on CORESET #0. The seventh DCI is used to schedule a third PDSCH. The seventh DCI is the scheduling information transmitted on CORESET #0. When receiving the third PDSCH, the terminal device may perform rate matching according to a cell reference signal (CRS) pattern set corresponding to the group index of CORESET #0.

According to an optional embodiment, when the network device configures the terminal device to use an independent HARQ-ACK feedback, data scheduled by CORESETs corresponding to different group indexes correspond to different HARQ-ACK codebooks. In this way, feedback information (for example, ACK/NACK) corresponding to the data scheduled by the scheduling information transmitted on different CORESETs may be independently transmitted, thus effectively supporting a non-ideal backhaul scenario.

According to an optional embodiment, when the network device configures the terminal device to use a semi-static HARQ-ACK codebook, HARQ-ACK information bits are accordingly concatenated in the following order by operations of: firstly, indexing in an ascending order across PDSCH reception occasion indexes of the same serving cell corresponding to the same group index; secondly, indexing in an ascending order across serving cell indexes corresponding to the same group index; and finally, indexing in an ascending order across group indexes.

For the convenience of description, it is assumed that the TRPs or the serving cells are indexed from 0. An example of the indexing is as follows.

Firstly, indexing is performed across HARQ-ACK information bits corresponding to PDSCH reception occasions on the serving cell 0, wherein the serving cell 0 corresponds to TRP 0. That is, indexing is performed in an ascending order across the PDSCH reception occasion indexes of the same serving cell corresponding to the same group index.

Secondly, indexing is performed across HARQ-ACK information bits corresponding to PDSCH reception occasions on the serving cell 1, wherein the serving cell 1 corresponds to TRP 0, until indexing is completed across HARQ-ACK information bits corresponding to PDSCH reception occasions on N serving cells (which are corresponding to TRP 0). That is, indexing is performed in an ascending order across the serving cell indexes corresponding to the same group index. N is a positive integer.

Then, indexing is performed across HARQ-ACK information bits corresponding to PDSCH reception occasions on the serving cell 0, wherein the serving cell 0 corresponds to TRP 1.

After that, indexing is performed across HARQ-ACK information bits corresponding to PDSCH reception occasions on the serving cell 1, wherein the serving cell 1 corresponds to TRP 1, until indexing is completed across HARQ-ACK information bits corresponding to PDSCH reception occasions on N serving cells (which are corresponding to the TRP 1). That is, indexing is performed in an ascending order across the group indexes. In an example, TRP0 and TRP1 correspond to different group indexes.

There may be other examples for indexing across the HARQ-ACK information bits. For example, there may be only the serving cell 2 and the serving cell 3 at a certain time in actual. In this case, indexing should start from the serving cell 2. That is, indexing should be performed firstly across HARQ-ACK information bits corresponding to PDSCH reception occasions on the serving cell 2, wherein the serving cell 2 corresponds to TRP 0. Indexing across the remaining HARQ-ACK information bits may be based on the same principle as the foregoing example.

According to an optional embodiment, when the network device configures the terminal device to use a dynamic HARQ-ACK codebook, the terminal device may determine a physical uplink control channel (PUCCH) resource according to eighth DCI. The eighth DCI is the scheduling information transmitted on CORESET #0.

The eighth DCI may be the last DCI among DCIs arranged in the following order by operations of: firstly, indexing in the ascending order across the group indexes corresponding to the DCIs in the same PDCCH monitoring occasion of the same serving cell; secondly, indexing in the ascending order across serving cell indexes in the same PDCCH monitoring occasion; and finally, indexing in the ascending order across the PDCCH monitoring occasions.

For the convenience of description, it is assumed that the serving cells and PDCCH monitoring occasions are both indexed from 0. An example of indexing is as follows.

Firstly, indexing is performed across DCIs corresponding to the serving cell 0 in the PDCCH monitoring occasion 0. Different DCIs corresponding to the serving cell 0 may correspond to different group indexes. That is, indexing is performed in the ascending order across the group indexes corresponding to the DCIs in the same PDCCH monitoring occasion of the same serving cell.

Secondly, indexing is performed across DCIs corresponding to the serving cell 1 in the PDCCH monitoring occasion 0, until indexing is completed across the DCIs corresponding to N serving cells in the PDCCH monitoring occasion 0. That is, indexing is performed in the ascending order across serving cell indexes in the same PDCCH monitoring occasion. N is the positive integer.

Then, indexing is performed across DCIs corresponding to the serving cell 0 in the PDCCH monitoring occasion 1.

After that, indexing is performed across DCIs corresponding to the serving cell 1 in the PDCCH monitoring occasion 1, until indexing is completed across DCIs corresponding to N serving cells in the PDCCH monitoring occasion 1. That is, indexing is performed in the ascending order across the PDCCH monitoring occasions.

According to an optional embodiment, when the UE specific search space is configured on CORESET #0, and the number of blind detections or the number of control channel elements (CCEs) on all the UE specific search spaces corresponding to the group index of CORESET #0 exceeds a second threshold, the terminal device may not monitor the respective UE specific search space according to indexes of the UE specific search spaces corresponding to the group index of CORESET #0 from the largest index, until the number of blind detections or the number of CCEs meets the second threshold.

The terminal device may determine the second threshold based on a reported capability of the terminal device, or may determine the second threshold according to the protocol, or may determine the second threshold according to information configured by the network device.

The foregoing describes in detail that the terminal device performs the multiple-PDCCH based transmission scheme after the group index of CORESET #0 is determined. The terminal device may also perform the multiple-PDCCH based transmission scheme according to the method shown in FIG. 4.

Figure 4:
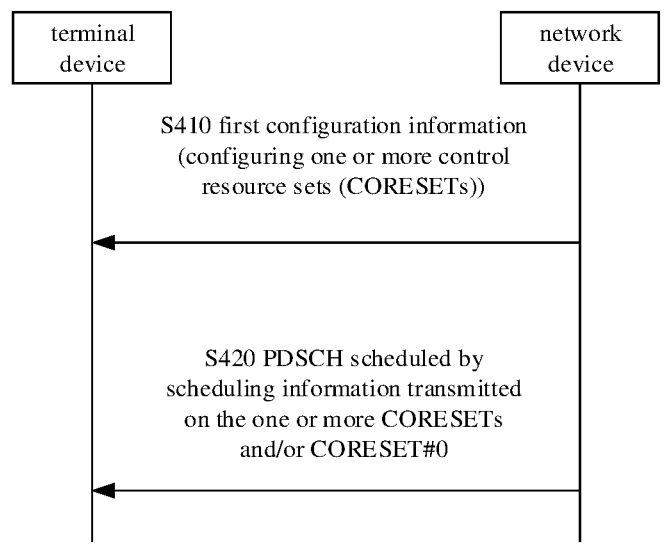
FIG. 4 is a schematic diagram of another communication method according to an embodiment of the present disclosure.

As shown in FIG. 4, the method includes the following steps S410 and S420.

In S410, first configuration information is received. The first configuration information is used to configure one or more CORESETs, at least one of the one or more CORESETs is configured with a respective group index, and the one or more CORESETs do not include CORESET #0.

The step S410 is the same as the step S310, and will not be repeated here.

In S420, according to scheduling information transmitted on the one or more CORESETs and/or CORESET #0, a physical downlink shared channel (PDSCH) scheduled by the scheduling information is received.

According to an optional embodiment, when performing the step S420, the terminal device may receive first DCI on CORESET #0. The first DCI is used to schedule a first PDSCH. The first DCI is the scheduling information transmitted on CORESET #0.

When the first DCI meets a first preset condition, and the first DCI and the first PDSCH correspond to the same CC, the terminal device receives the first PDSCH according to a TCI state or a QCL assumption of a first CORESET.

When the first DCI meets the first preset condition, and the first DCI and the first PDSCH correspond to different CCs, the first PDSCH is received according to a first TCI state or a first QCL assumption.

The first preset condition indicates that the first DCI does not include a TCI state indication field, or that a time interval between the first DCI and the first PDSCH is less than a first threshold or less than or equal to the first threshold.

The first CORESET is a CORESET with the smallest identifier (ID) among target CORESETs within the most recently detected downlink slot on a BWP corresponding to the first DCI. The target CORESETs comprise CORESETs corresponding to a first group index. Alternatively, the target CORESETs comprise the CORESETs corresponding to the first group index and/or CORESET #0.

When the target CORESETs comprise the CORESETs corresponding to the first group index and/or CORESET #0, the terminal device may associate CORESET #0 with a known group index without determining the group index of CORESET #0. Thus, the known group index may be used to determine which TRP CORESET #0 is associated with, and the multiple-PDCCH based transmission scheme can be realized.

When the target CORESETs comprise the CORESETs corresponding to the first group index, the scheme can be simplified and the communication complexity can be reduced.

The first group index may be the smallest group index or the largest group index among at least one preset group index.

The first CORESET is a CORESET with the smallest ID among CORESETs within the most recently detected downlink slot on a respective BWP.

The TCI state of the first CORESET may be an activated TCI state of the first CORESET.

In addition, the first TCI state comprises: a TCI state with the smallest ID among activated TCI states corresponding to PDSCHs on a BWP where the first PDSCH is located; or a TCI state with the smallest ID among activated TCI states, corresponding to the smallest group index, on the BWP where the first PDSCH is located; or a TCI state with the smallest ID among activated TCI states, corresponding to the largest group index, on the BWP where the first PDSCH is located.

The first QCL assumption may be a QCL assumption corresponding to a CORESET with the smallest ID among at least one CORESET on the BWP where the first PDSCH is located.

The above solution adopts different schemes for cross-carrier scheduling and non-cross-carrier scheduling, which improves the system flexibility.

According to an optional embodiment, when performing the step S420, the terminal device may receive second DCI on CORESET #0. The second DCI is used to schedule a first CSI-RS. The second DCI is the scheduling information transmitted on CORESET #0.

When the second DCI meets a second preset condition, and the second DCI and the first CSI-RS correspond to the same CC, the first CSI-RS is received according to a TCI state or a QCL assumption of a second CORESET.

When the second DCI meets the second preset condition, and the second DCI and the first CSI-RS correspond to different CCs, the first CSI-RS is received according to a second TCI state or a second QCL assumption.

The second preset condition indicates that a time interval between the second DCI and the first CSI-RS is less than a first threshold or less than or equal to the first threshold.

The second CORESET may be a CORESET with the smallest ID among target CORESETs within the most recently detected downlink slot on a BWP corresponding to the second DCI. The target CORESETs comprise CORESETs corresponding to a second group index. Alternatively, the target CORESETs comprise the CORESETs corresponding to the second group index and CORESET #0.

When the target CORESETs comprise the CORESETs corresponding to the second group index and/or CORESET #0, the terminal device may associate CORESET #0 with a known group index without determining the group index of CORESET #0. Thus, the known group index may be used to determine which TRP CORESET #0 is associated with, and the multiple-PDCCH based transmission scheme can be realized.

When the target CORESETs comprise the CORESETs corresponding to the second group index, the scheme can be simplified and the communication complexity can be reduced.

The second group index may be the smallest group index or the largest group index among at least one preset group index.

The second CORESET may be a CORESET with the smallest ID among CORESETs within the most recently detected downlink slot on a respective BWP. The TCI state of the second CORESET may be an activated TCI state of the second CORESET.

The second TCI state comprises: a TCI state with the smallest ID among activated TCI states corresponding to PDSCHs on a BWP where the first CSI-RS is located; or a TCI state with the smallest ID among activated TCI states, corresponding to the smallest group index, on the BWP where the first CSI-RS is located; or a TCI state with the smallest ID among activated TCI states, corresponding to the largest group index, on the BWP where the first CSI-RS is located.

The second QCL assumption is a QCL assumption corresponding to a CORESET with the smallest ID among CORESETs on the BWP where the first CSI-RS is located.

The above solution adopts different schemes for cross-carrier scheduling and non-cross-carrier scheduling, which improves the system flexibility.

In some embodiments, the first threshold may be configured by the network device, or specified by the protocol, or reported by the terminal device.

When the terminal device reports the first threshold, the terminal device may report the first threshold through parameters of timeDurationForQCL (corresponding to PDSCH) and/or beamSwitchTiming (corresponding to CSI-RS). The parameters of timeDurationForQCL and/or beamSwitchTiming include first thresholds corresponding to one or more bands. Alternatively, the parameters of timeDurationForQCL and/or beamSwitchTiming include first thresholds corresponding to one or more band combinations. The terminal device reports its own capability, such that the network device determines the first threshold suitable for the terminal device based on the capability of the terminal device. Thus, the multiple-PDCCH based transmission scheme can support terminal devices with different capabilities.

According to an optional embodiment, when performing the step S420, the terminal device may receive third DCI on CORESET #0. The third DCI is the scheduling information transmitted on CORESET #0. The third DCI is used to schedule a second PDSCH, and a scrambling ID of the second PDSCH is one of at least one PDSCH scrambling ID configured by first RRC signaling The first RRC signaling may be dataScramblingIdentityPDSCH and/or AdditionalDataScramblingIdentityPDSCH. The third DCI may be in a DCI format 1-1, or in a DCI format 1-0 transmitted in a UE specific search space.

The above solution helps to randomize the interference between PDSCHs sent by different TRPs, and improve the communication performance.

According to an optional embodiment, when performing the step S420, the terminal device may receive fourth DCI on CORESET #0. The fourth DCI is the scheduling information transmitted on CORESET #0. The fourth DCI is used to schedule a first PUSCH, and a scrambling ID of the first PUSCH is one of at least one PUSCH scrambling ID configured by second RRC signaling The second RRC signaling may be dataScramblingIdentityPUSCH and/or AdditionalDataScramblingIdentityPUSCH. The fourth DCI is in a DCI format 0-1. Alternatively, the fourth DCI is in a DCI format 0-0 transmitted in the UE specific search space.

The above solution helps to randomize the interference between uplink data, and improve the communication performance.

According to an optional embodiment, when performing the step S420, the terminal device may receive fifth DCI on CORESET #0. The fifth DCI is the scheduling information transmitted on CORESET #0. A PDCCH scrambling ID corresponding to the fifth DCI is one of at least one PDCCH scrambling ID configured by third RRC signaling The third RRC signaling may be pdcch-DMRS-ScramblingID and/or Addtionalpdcch-DMRS-ScramblingID. The fifth DCI may be DCI transmitted in the UE specific search space.

The above solution helps to randomize the interference between the PDCCHs sent on different TRPs and CORESET #0, and improve the communication performance.

According to an optional embodiment, when performing the step S420, the terminal device may receive sixth DCI on CORESET #0. The sixth DCI is the scheduling information transmitted on CORESET #0. The sixth DCI is used to schedule a third PDSCH. When receiving the third PDSCH, the terminal device may perform rate matching according to a first CRS pattern set.

The first CRS pattern set may comprise at least one CRS pattern corresponding to the smallest group index, or at least one CRS pattern corresponding to the largest group index, or all the CRS patterns corresponding to a current BWP.

The above solution helps to render the data scheduled by CORESET #0 to be better suitable for a shared situation between a new radio (NR) spectrum and a long term evolution (LTE) spectrum on different TRPs.

According to an optional embodiment, when the terminal device performs the step S420, HARQ-ACK feedback information corresponding to data scheduled by DCI received on CORESET #0 corresponds to a first HARQ-ACK codebook.

The first HARQ-ACK codebook is a HARQ-ACK codebook corresponding to the smallest group index. Alternatively, the first HARQ-ACK codebook is a HARQ-ACK codebook corresponding to the largest group index.

The above solution enables feedback information (for example, ACK/NACK) corresponding to the data scheduled by different CORESET groups to be independently transmitted, so that a non-ideal backhaul scenario is better supported.

According to an optional embodiment, when the network device configures the terminal device to use a semi-static HARQ-ACK codebook, HARQ-ACK information bits are accordingly concatenated in the following order by operations of: firstly, indexing in an ascending order across PDSCH reception occasion indexes of the same serving cell corresponding to the same group index; secondly, indexing in an ascending order across serving cell indexes corresponding to the same group index; and finally, indexing in an ascending order across the group indexes.

For the convenience of description, it is assumed that the TRPs or the serving cells are indexed from 0. An example of the indexing is as follows.

Firstly, indexing is performed across HARQ-ACK information bits corresponding to PDSCH reception occasions on the serving cell 0, wherein the serving cell 0 corresponds to TRP 0. That is, indexing is performed in an ascending order across the PDSCH reception occasion indexes of the same serving cell corresponding to the same group index.

Secondly, indexing is performed across HARQ-ACK information bits corresponding to PDSCH reception occasions on the serving cell 1, wherein the serving cell 1 corresponds to TRP 0, until indexing is completed across HARQ-ACK information bits corresponding to PDSCH reception occasions on N serving cells, which are corresponding to TRP 0. That is, indexing is performed in an ascending order across the serving cell indexes corresponding to the same group index. N is a positive integer.

Then, indexing is performed across HARQ-ACK information bits corresponding to PDSCH reception occasions on the serving cell 0, wherein the serving cell 0 corresponds to TRP 1.

After that, indexing is performed across HARQ-ACK information bits corresponding to PDSCH reception occasions on the serving cell 1, wherein the serving cell 1 corresponds to TRP 1, until indexing is completed across HARQ-ACK information bits corresponding to PDSCH reception occasions on N serving cells, which are corresponding to the TRP 1. That is, indexing is performed in the ascending order across the group indexes. In an example, TRP0 and TRP1 correspond to different group indexes.

When indexing is performed in the ascending order across the group indexes, the smallest group index or the largest group index may be used for indexing of the PDSCH scheduled by the DCI on CORESET #0. That is, the PDSCH scheduled by the DCI on CORESET #0 may be indexed together with the PDSCH corresponding to TRP 0. Alternatively, or the PDSCH scheduled by the DCI on CORESET #0 may be indexed together with the PDSCH corresponding to TRP N (wherein TRP N is a TRP with the largest group index).

The above solution helps to render the terminal device and the network device to have consistent understanding about indexing of the PDSCHs scheduled by the DCI on CORESET #0, and improve the performance of the communication system.

There may be other examples for indexing across the HARQ-ACK information bits. For example, there may be only the serving cell 2 and the serving cell 3 at a certain time in actual. In this case, indexing should start from the serving cell 2. That is, indexing is firstly performed across HARQ-ACK information bits corresponding to PDSCH reception occasions on the serving cell 2, wherein the serving cell 2 corresponds to TRP 0. Indexing across the remaining HARQ-ACK information bits may be based on the same principle as the foregoing example.

According to an optional embodiment, when the network device configures the terminal device to use a dynamic HARQ-ACK codebook, the terminal device may determine a PUCCH resource according to seventh DCI. The seventh DCI is the last DCI in the DCIs arranged in the following order by operations of: firstly, indexing in the ascending order across group indexes corresponding to the DCIs in the same PDCCH monitoring occasion of the same serving cell; secondly, indexing in the ascending order across serving cell indexes in the same PDCCH monitoring occasion; and finally, indexing in the ascending order across the PDCCH monitoring occasions.

For the convenience of description, it is assumed that the serving cells and PDCCH monitoring occasions are both indexed from 0. An example of the indexing is as follows.

Firstly, indexing is performed across DCIs corresponding to the serving cell 0 in the PDCCH monitoring occasion 0. Different DCIs corresponding to the serving cell 0 may correspond to different group indexes. That is, indexing is performed in the ascending order across the group indexes corresponding to the DCIs in the same PDCCH monitoring occasion of the same serving cell.

Secondly, indexing is performed across DCIs corresponding to the serving cell 1 in the PDCCH monitoring occasion 0, until indexing is completed across DCIs corresponding to N serving cells in the PDCCH monitoring occasion 0. That is, indexing is performed in the ascending order across serving cell indexes in the same PDCCH monitoring occasion. N is the positive integer.

Then, indexing is performed across DCIs corresponding to the serving cell 0 in the PDCCH monitoring occasion 1.

After that, indexing is performed across DCIs corresponding to the serving cell 1 in the PDCCH monitoring occasion 1, until indexing is completed across DCIs corresponding to N serving cells in the PDCCH monitoring occasion 1. That is, indexing is performed in the ascending order across the PDCCH monitoring occasions.

When indexing is performed in the ascending order across the group indexes, the smallest group index or the largest group index may be used for indexing of the PDSCH scheduled by the DCI on CORESET #0.

The above solution helps to render the terminal device and the network device to have consistent understanding about indexing of the PDSCHs scheduled by the DCI on CORESET #0, and improve the performance of the communication system.

According to an optional embodiment, when the UE specific search space is configured on CORESET #0, and the number of blind detections or the number of CCEs on target UE specific search spaces exceeds a second threshold, the terminal device may not monitor the respective UE specific search space according to indexes of the target UE specific search spaces from the largest index (which may be simply referred to as dropping), until the second threshold is met.

The target UE specific search spaces include a UE specific search space corresponding to CORESET #0 and all the UE specific search spaces corresponding to a first group index.

Therefore, the terminal device and the network device may have the consistent understanding about the correspondence between CORESET #0 and TRP, and the performance of the communication system is improved.

The first group index may be the smallest group index or the largest group index.

The second threshold may be determined based on a reported capability of the terminal device, may also be determined according to the protocol, or may be configured by the network device.

The above solution helps to render the terminal device and the network device to have the consistent understanding about the correspondence between CORESET #0 and TRP when indexing, and improve the performance of the communication system.

The examples of the communication method according to an embodiment of the present disclosure have been described in detail above. It can be understood that, in order to implement the above-mentioned functions, a communication apparatus includes hardware structures and/or software modules corresponding to each function. For those of ordinary skill in the art, it is easy to realize that the present disclosure may be implemented in the form of hardware or a combination of hardware and computer software, in combination with the units and algorithm steps of each example described in embodiments disclosed herein. Whether a certain function is executed by hardware or executed in a way that computer software drives hardware depends on the specific application and scheme constraint conditions of the technical solution. For each specific application, professionals and technicians may use different methods to implement the described functions, but such implementation should not be considered beyond the scope of the present disclosure.

The present disclosure may divide the functional units of the communication apparatus according to the method examples above. For example, each functional unit may be divided corresponding to each function, or two or more functions may be integrated into one processing unit. The integrated unit may be implemented in the form of hardware or in the form of software functional unit. It should be noted that the division of units in an embodiment of the present disclosure is illustrative, and is only a logical function division. There may be other division methods in actual implementations.

Figure 5:
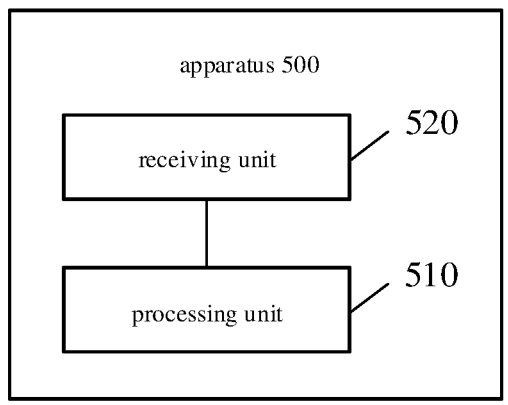
FIG. 5 is a schematic diagram of a communication apparatus according to an embodiment of the present disclosure.

FIG. 5 is a schematic structural diagram of an apparatus for sending a random access message according to an embodiment of the present disclosure. The apparatus 500 includes a processing unit 510 and a receiving unit 520. The receiving unit 520 may perform receiving steps under the control of the processing unit 510.

The receiving unit 520 may perform an operation of receiving first configuration information. The first configuration information is used to configure one or more CORESETs. At least one of the one or more CORESETs is configured with a respective group index. The one or more CORESETs do not include CORESET #0.

The processing unit 510 may perform an operation of determining a group index of CORESET #0.

The receiving unit 520 may also perform an operation of receiving, according to scheduling information transmitted on the one or more CORESETs and/or CORESET #0, a PDSCH scheduled by the scheduling information.

Optionally, the processing unit 510 is specifically configured to: in response to receipt of second configuration information configuring the group index of CORESET #0, determine the group index of CORESET #0 according to the second configuration information; or in response to no receipt of the second configuration information configuring the group index of CORESET #0, determine the group index of CORESET #0 according to preset information.

Optionally, the group index of CORESET #0 is the smallest group index among at least one preset group index.

Alternatively, the group index of CORESET #0 is the largest group index among the at least one preset group index.

Optionally, the second configuration information is carried in first RRC signaling. Alternatively, the second configuration information is carried in a MAC CE. Further alternatively, the second configuration information is carried in first DCI.

Optionally, the first RRC signaling is search space configuration signaling corresponding to CORESET #0.

Optionally, the second configuration information being carried in the first DCI means that the second configuration information is carried in scrambling information of the first DCI.

Optionally, the receiving unit 520 is specifically configured to receive second DCI on CORESET #0, wherein the second DCI is used to schedule first PDSCH. The receiving unit 520 is further configured to: receive the first PDSCH according to a transmission configuration indicator (TCI) state or a QCL assumption of a first CORESET, when the second DCI meets a first preset condition, and the second DCI and the first PDSCH correspond to the same component carrier (CC); or receive the first PDSCH according to a first TCI state or a first QCL assumption, when the second DCI meets the first preset condition, and the second DCI and the first PDSCH correspond to different CCs.

Optionally, the first preset condition indicates that the second DCI does not include a TCI state indication field, or that a time interval between the second DCI and the first PDSCH is less than a first threshold or less than or equal to the first threshold.

Optionally, the first CORESET is a CORESET with the smallest identifier (ID) among at least one CORESET within the most recently detected downlink slot on a BWP corresponding to the second DCI.

Optionally, the first CORESET is a CORESET with the smallest ID among at least one CORESET, corresponding to the group index of CORESET #0, within the most recently detected downlink slot on a BWP corresponding to the second DCI.

Optionally, the transmission configuration indicator (TCI) state of the first CORESET includes an activated TCI state of the first CORESET.

Optionally, the first TCI state is a TCI state with the smallest ID among activated TCI states corresponding to PDSCHs on a BWP where the first PDSCH is located. Alternatively, the first TCI state is a TCI state with the smallest ID among activated TCI states, corresponding to the group index of CORESET #0, on the BWP where the first PDSCH is located. Further alternatively, the first TCI state is an activated TCI state corresponding to a CORESET with the smallest ID among at least one CORESET on the BWP where the first PDSCH is located.

Optionally, the first QCL assumption is a QCL assumption corresponding to the CORESET with the smallest ID among the at least one CORESET on the BWP where the first PDSCH is located.

Optionally, the receiving unit 520 is specifically configured to receive third DCI on CORESET #0. The third DCI is used to schedule a first CSI-RS. The receiving unit 520 is further configured to: receive the first CSI-RS according to a TCI state or a QCL assumption of a second CORESET, when the third DCI meets a second preset condition, and the third DCI and the first CSI-RS correspond to the same CC; or receive the first CSI-RS according to a second TCI state or a second QCL assumption, when the third DCI meets the second preset condition, and the third DCI and the first CSI-RS correspond to different CCs.

Optionally, the second preset condition indicates that a time interval between the third DCI and the first CSI-RS is less than a first threshold or less than or equal to the first threshold.

Optionally, the second CORESET is a CORESET with the smallest ID among CORESETs within the most recently detected downlink slot on a BWP corresponding to the third DCI.

Optionally, the second CORESET is a CORESET with the smallest ID among CORESETs, corresponding to the group index of CORESET #0, within the most recently detected downlink slot on a BWP corresponding to the third DCI.

Optionally, the TCI state of the second CORESET includes an activated TCI state of the second CORESET.

Optionally, the second TCI state is a TCI state with the smallest ID among activated TCI states corresponding to PDSCHs on a BWP where the first CSI-RS is located. Alternatively, the second TCI state is a TCI state with the smallest ID among activated TCI states, corresponding to the group index of CORESET #0, on the BWP where the first CSI-RS is located. Further alternatively, the second TCI state is an activated TCI state corresponding to a CORESET with the smallest ID among CORESETs on the BWP where the first CSI-RS is located.

Optionally, the second QCL assumption is a QCL assumption corresponding to the CORESET with the smallest ID among the CORESETs on the BWP where the first CSI-RS is located.

Optionally, the first threshold is configured by a network device. Alternatively, the first threshold is specified by a protocol. Further alternatively, the first threshold is reported by a terminal device.

Optionally, the first threshold being reported by the terminal device means that the first threshold is reported by the terminal device through parameters of timeDurationForQCL (corresponding to PDSCH) and/or beamSwitchTiming (corresponding to CSI-RS).

Optionally, the parameters of timeDurationForQCL and/or beamSwitchTiming include first thresholds corresponding to one or more bands. Alternatively, the parameters of timeDurationForQCL and/or beamSwitchTiming include first thresholds corresponding to one or more band combinations.

Optionally, the receiving unit 520 is specifically configured to receive fourth DCI on CORESET #0. The fourth DCI is used to schedule a second PDSCH, and a scrambling ID of the second PDSCH is a PDSCH scrambling ID corresponding to the group index of CORESET #0.

Optionally, the PDSCH scrambling ID is one of at least one scrambling ID configured by second RRC signaling.

Optionally, the second RRC signaling is dataScrambhngIdentityPDSCH and/or AdditionalDataScramblingIdentityPDSCH.

Optionally, the fourth DCI is in a DCI format 1-1. Alternatively, the fourth DCI is in a DCI format 1-0 transmitted in a UE specific search space.

Optionally, the receiving unit 520 is specifically configured to receive fifth DCI on CORESET #0. The fifth DCI is used to schedule a first physical uplink shared channel (PUSCH), and a scrambling ID of the first PUSCH is a PUSCH scrambling ID corresponding to the group index of CORESET #0.

Optionally, the PUSCH scrambling ID is one of at least one scrambling ID configured by third RRC signaling.

Optionally, the third RRC signaling is dataScramblingIdentityPUSCH and/or AdditionalDataScramblingIdentityPUSCH.

Optionally, the fifth DCI is in a DCI format 0-1. Alternatively, the fifth DCI is in a DCI format 0-0 transmitted in the UE specific search space.

Optionally, the receiving unit 520 is specifically configured to receive sixth DCI on CORESET #0. A PDCCH scrambling ID corresponding to the sixth DCI is a PDCCH scrambling ID corresponding to the group index of CORESET #0.

Optionally, the PDCCH scrambling ID is one of at least one scrambling ID configured by fourth RRC signaling.

Optionally, the fourth RRC signaling is pdcch-DMRS-ScramblingID and/or Addtionalpdcch-DMRS-ScramblingID.

Optionally, the sixth DCI is DCI transmitted in the UE specific search space.

Optionally, the receiving unit 520 is specifically configured to: receive seventh DCI on CORESET #0, wherein the seventh DCI is used to schedule a third PDSCH; and perform rate matching according to a CRS pattern corresponding to the group index of CORESET #0, upon receipt of the third PDSCH.

Optionally, when the network device configures the terminal device to use an independent HARQ-ACK feedback, data scheduled by CORESETs corresponding to different group indexes correspond to different HARQ-ACK codebooks.

Optionally, when the network device configures the terminal device to use a semi-static HARQ-ACK codebook, HARQ-ACK information bits are accordingly concatenated in the following order by operations of: firstly, indexing in an ascending order across PDSCH reception occasion indexes of the same serving cell corresponding to the same group index; secondly, indexing in an ascending order across serving cell indexes corresponding to the same group index; and finally, indexing in an ascending order across the group indexes.

Optionally, when the network device configures the terminal device to use a dynamic HARQ-ACK codebook, the receiving unit is specifically configured to determine a physical uplink control channel (PUCCH) resource according to eighth DCI.

Optionally, the eighth DCI is the last DCI among DCIs arranged in the following order by operations of: firstly, indexing in the ascending order across group indexes corresponding to the DCIs in the same PDCCH monitoring occasion of the same serving cell; secondly, indexing in the ascending order across serving cell indexes in the same PDCCH monitoring occasion; and finally, indexing in the ascending order across the PDCCH monitoring occasions.

Optionally, the processing unit 510 is further configured such that when a UE specific search space is configured on CORESET #0, and the number of blind detections or the number of control channel elements (CCEs) on all the UE specific search spaces corresponding to the group index of CORESET #0 exceeds a second threshold, dropping is started according to indexes of the UE specific search spaces corresponding to the group index of CORESET #0 from the largest index, until the second threshold is met.

Optionally, the second threshold is determined based on a reported capability of the terminal device. Alternatively, the second threshold is determined according to the protocol. Further alternatively, the second threshold is configured by the network device.

For the specific ways in which the apparatus 500 performs the communication method and the beneficial effects produced thereby, reference may be made to the related description in the method embodiments.

Figure 6:
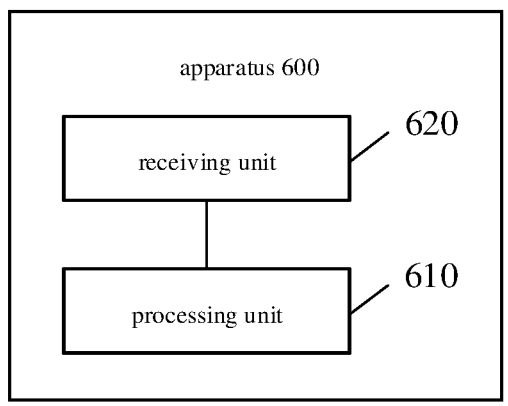
FIG. 6 is a schematic diagram of another communication apparatus according to an embodiment of the present disclosure.

FIG. 6 is a schematic structural diagram of an apparatus for receiving a random access message according to an embodiment of the present disclosure. The apparatus 600 includes a processing unit 610 and a receiving unit 620. The receiving unit 620 may perform receiving steps under the control of the processing unit 610.

The receiving unit 620 is configured to receive first configuration information. The first configuration information is used to configure one or more CORESETs, at least one of the one or more CORESETs is configured with a respective group index, and the one or more CORESETs do not include CORESET #0.

The receiving unit 620 is further configured to receive, according to scheduling information transmitted on the one or more CORESETs and/or CORESET #0, a PDSCH scheduled by the scheduling information.

Optionally, the receiving unit 620 is specifically configured to receive first DCI on CORESET #0. The first DCI is used to schedule a first PDSCH. The receiving unit 620 is further configured to: receive the first PDSCH according to a transmission configuration indicator (TCI) state or a QCL assumption of a first CORESET, when the first DCI meets a first preset condition, and the first DCI and the first PDSCH correspond to the same CC; or receive the first PDSCH according to a first TCI state or a first QCL assumption, when the first DCI meets the first preset condition, and the first DCI and the first PDSCH correspond to different CCs.

Optionally, the first preset condition indicates that the first DCI does not include a TCI state indication field, or that a time interval between the first DCI and the first PDSCH is less than a first threshold or less than or equal to the first threshold.

Optionally, the first CORESET is a CORESET with the smallest identifier (ID) among target CORESETs within the most recently detected downlink slot on a bandwidth part (BWP) corresponding to the first DCI. The target CORESETs may comprise CORESETs corresponding to a first group index. Alternatively, the target CORESETs may comprise the CORESETs corresponding to the first group index and/or CORESET #0.

Optionally, the first group index is the smallest group index or the largest group index.

Optionally, the first CORESET is a CORESET with the smallest ID among CORESETs within the most recently detected downlink slot on a respective BWP.

Optionally, the transmission configuration indicator (TCI) state of the first CORESET includes an activated TCI state of the first CORESET.

Optionally, the first TCI state is a TCI state with the smallest ID among activated TCI states corresponding to PDSCHs on a BWP where the first PDSCH is located. Alternatively, the first TCI state is a TCI state with the smallest ID among activated TCI states, corresponding to the smallest group index, on the BWP where the first PDSCH is located. Further alternatively, the first TCI state is a TCI state with the smallest ID among activated TCI states, corresponding to the largest group index, on the BWP where the first PDSCH is located.

Optionally, the first QCL assumption is a QCL assumption corresponding to a CORESET with the smallest ID among at least one CORESET on the BWP where the first PDSCH is located.

Optionally, the receiving unit 620 is specifically configured to: receive second DCI on CORESET #0. The second DCI is used to schedule a first CSI-RS. The receiving unit 620 is further configured to: receive the first CSI-RS according to a TCI state or a QCL assumption of a second CORESET, when the second DCI meets a second preset condition, and the second DCI and the first CSI-RS correspond to the same CC; or receive the first CSI-RS according to a second TCI state or a second QCL assumption, when the second DCI meets the second preset condition, and the second DCI and the first CSI-RS correspond to different CCs.

Optionally, the second preset condition indicates that a time interval between the second DCI and the first CSI-RS is less than a first threshold or less than or equal to the first threshold.

Optionally, the second CORESET is a CORESET with the smallest ID among target CORESETs within the most recently detected downlink slot on a BWP corresponding to the second DCI. The target CORESETs may comprise CORESETs corresponding to a second group index. Alternatively, the target CORESETs may comprise the CORESETs corresponding to the second group index and CORESET #0.

Optionally, the second group index is the smallest group index or the largest group index.

Optionally, the second CORESET is a CORESET with the smallest ID among CORESETs within the most recently detected downlink slot on a respective BWP.

Optionally, the TCI state of the second CORESET includes an activated TCI state of the second CORESET.

Optionally, the second TCI state is a TCI state with the smallest ID among activated TCI states corresponding to PDSCHs on a BWP where the first CSI-RS is located. Alternatively, the second TCI state is a TCI state with the smallest ID among activated TCI states, corresponding to the smallest group index, on the BWP where the first CSI-RS is located. Further alternatively, the second TCI state is a TCI state with the smallest ID among activated TCI states, corresponding to the largest group index, on the BWP where the first CSI-RS is located.

Optionally, the second QCL assumption is a QCL assumption corresponding to a CORESET with the smallest ID among CORESETs on the BWP where the first CSI-RS is located.

Optionally, the first threshold is configured by a network device. Alternatively, the first threshold is specified by a communication protocol. Further alternatively, the first threshold is reported by a terminal device.

Optionally, the first threshold being reported by the terminal device indicates that the first threshold is reported by the terminal device through parameters of timeDurationForQCL and/or beamSwitchTiming.

Optionally, the parameters of timeDurationForQCL (corresponding to PDSCH) and/or beamSwitchTiming (corresponding to CSI-RS) include first thresholds corresponding to different bands. Alternatively, the parameters of timeDurationForQCL and/or beamSwitchTiming include first thresholds corresponding to different band combinations.

Optionally, the receiving unit 620 is specifically configured to receive third DCI on CORESET #0. The third DCI is used to schedule a second PDSCH, and a scrambling ID of the second PDSCH is one of at least one PDSCH scrambling ID configured by first RRC signaling.

Optionally, the first RRC signaling is dataScramblingIdentityPDSCH and/or AdditionalDataScramblingIdentityPDSCH.

Optionally, the third DCI is in a DCI format 1-1. Alternatively, the third DCI is in a DCI format 1-0 transmitted in a UE specific search space.

Optionally, the receiving unit 620 is specifically configured to receive fourth DCI on CORESET #0. The fourth DCI is used to schedule a first PUSCH, and a scrambling ID of the first PUSCH is one of at least one PUSCH scrambling ID configured by second RRC signaling.

Optionally, the second RRC signaling is dataScramblingIdentityPUSCH and/or AdditionalDataScramblingIdentityPUSCH.

Optionally, the fourth DCI is in a DCI format 0-1. Alternatively, the fourth DCI is in a DCI format 0-0 transmitted in the UE specific search space.

Optionally, the receiving unit 620 is specifically configured to receive fifth DCI on CORESET #0. The PDCCH scrambling ID corresponding to the fifth DCI is one of at least one PDCCH scrambling ID configured by third RRC signaling.

Optionally, the third RRC signaling is pdcch-DMRS-ScramblingID or Addtionalpdcch-DMRS-ScramblingID.

Optionally, the fifth DCI is DCI transmitted in the UE specific search space.

Optionally, the receiving unit 620 is specifically configured to: receive sixth DCI on CORESET #0, wherein the sixth DCI is used to schedule a third PDSCH; and perform rate matching according to a first CRS pattern set, upon receipt of the third PDSCH.

Optionally, the first CRS pattern set comprises at least one CRS pattern corresponding to the smallest group index.

Optionally, the first CRS pattern set comprises at least one CRS pattern corresponding to the largest group index.

Optionally, the first CRS pattern set comprises all the CRS patterns corresponding to the current BWP.

Optionally, HARQ-ACK feedback information corresponding to data scheduled by DCI received on CORESET #0 corresponds to a first HARQ-ACK codebook.

Optionally, the first HARQ-ACK codebook is a HARQ-ACK codebook corresponding to the smallest group index.

Optionally, the first HARQ-ACK codebook is a HARQ-ACK codebook corresponding to the largest group index.

Optionally, when the network device configures the terminal device to use a semi-static HARQ-ACK codebook, HARQ-ACK information bits are accordingly concatenated in the following order by operations of: firstly, indexing in an ascending order across PDSCH reception occasion indexes of the same serving cell corresponding to the same group index; secondly, indexing in an ascending order across serving cell indexes corresponding to the same group index; and finally, indexing in an ascending order across the group indexes.

Optionally, when the network device configures the terminal device to use a dynamic HARQ-ACK codebook, a physical uplink control channel (PUCCH) resource is determined according to seventh DCI.

Optionally, the seventh DCI is the last DCI among DCIs arranged in the following order by operations of: firstly, indexing in the ascending order across group indexes corresponding to the DCIs in the same PDCCH monitoring occasion of the same serving cell; secondly, indexing in the ascending order across serving cell indexes in the same PDCCH monitoring occasion; and finally, indexing in the ascending order across the PDCCH monitoring occasions.

Optionally, when indexing is performed in the ascending order across the group indexes, the smallest group index is used for indexing of PDSCH scheduled by DCI on CORESET #0.

Optionally, when indexing is performed in the ascending order across the group indexes, the largest group index is used for indexing of PDSCH scheduled by DCI on CORESET #0.

Optionally, the processing unit 610 is configured such that when the UE specific search space is configured on CORESET #0, and the number of blind detections or the number of CCEs on target UE specific search spaces exceeds a second threshold, dropping is started according to indexes of the target UE specific search spaces from the largest index, until the second threshold is met.

Optionally, the target UE specific search spaces include the UE specific search space corresponding to CORESET #0 and all the UE specific search spaces corresponding to a first group index.

Optionally, the first group index is the smallest group index.

Optionally, the first group index is the largest group index.

Optionally, the second threshold is determined based on a reported capability of the terminal device. Alternatively, the second threshold is determined according to the protocol. Further alternatively, the second threshold is configured by the network device.

For the specific ways in which the apparatus 600 performs the communication method and the beneficial effects produced thereby, reference may be made to the related description in the method embodiments.

Figure 7:
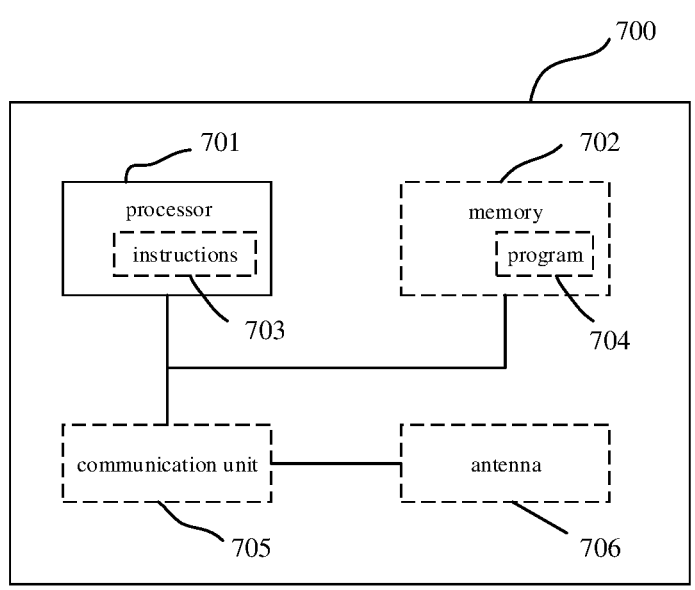
FIG. 7 is a schematic diagram of a communication device according to an embodiment of the present disclosure.

FIG. 7 shows a schematic structural diagram of a communication device according to an embodiment of the present disclosure. In FIG. 7, a unit or a module represented by a dotted line indicates that the unit or the module is optional. The device 700 may be configured to perform the method described in any of the above method embodiments. The device 700 may be a terminal device, a network device, or a chip.

The device 700 includes one or more processors 701. The one or more processors 701 may support the device 700 to perform the method according to any of the method embodiments. The processor 701 may be a general-purpose processor or a dedicated processor.

For example, the processor 701 may be a Central Processing Unit (CPU). CPU may be configured to control the device 700, execute a software program, and process data of the software program. The device 700 may further include a communication unit 705 for implementing signal input (receiving) and output (transmitting).

For example, the device 700 may be a chip. The communication unit 705 may be an input and/or output circuit of the chip. Alternatively, the communication unit 705 may be a communication interface of the chip. The chip may be embodied as a component of the terminal device or the network device or other wireless communication devices.

In another example, the device 700 may be a terminal device or a network device. The communication unit 705 may be a transceiver of the terminal device or the network device. Alternatively, the communication unit 705 may be a transceiver circuit of the terminal device or the network device.

The device 700 may include one or more memories 702 having a program 704 stored thereon. The program 704 may be executed by the processor 701 to generate instructions 703, such that the processor 701 performs the method described in any of the above method embodiments in accordance with the instructions 703. In an embodiment, data may also be stored in the memory 702. In an embodiment, the processor 701 may also read data stored in the memory 702. The data may be stored either at the same storage address as the program 704, or at a storage address different from that of the program 704.

The processor 701 and the memory 702 may be arranged separately or integrated together. For example, the processor 701 and the memory 702 may be integrated on a System On Chip (SOC) of the terminal device.

The device 700 may further include an antenna 706. The communication unit 705 may implement a transceiving function of the device 700 through the antenna 706.

For the specific way in which the communication method is performed by the processor 701, reference may be made to related description in the method embodiments.

Some or all of the aforementioned different DCIs (e.g. the first DCI, the second DCI, the third DCI, the fourth DCI, etc.) may be the same DCI. Alternatively, some or all of the different PDSCHs as described above (e.g. the first PDSCH, the second PDSCH, etc.) may be the same PDSCH.

It should be understood that each step of the above method embodiments may be implemented by hardware logic circuits or instructions in the form of software in the processor 701. The processor 701 may be a CPU, a Digital Signal Processor (DSP), an Application Specific Integrated Circuit (ASIC), a Field Programmable Gate Array (FPGA), or other programmable logic device, such as a discrete gate, a transistor logic device, or a discrete hardware component.

The present disclosure further provides a computer program product. The computer program product, when being executed by the processor 701, performs the method according to any method embodiment of the present disclosure.

The computer program product, such as the program 704, may be stored in the memory 702. The program 704 is converted into an executable object file that may be executed by the processor 701 after processing processes such as pre-processing, compilation, assembly, and linking.

The present disclosure further provides a computer-readable storage medium having a computer program stored thereon. The computer program, when being executed by a computer, performs the method according to any method embodiment of the present disclosure. The computer program may be a high-level language program or an executable target program.

The computer-readable storage medium may be, for example, the memory 702. The memory 702 may be a volatile memory or a non-volatile memory. Alternatively, the memory 702 may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which may be used as an external cache. By way of exemplary rather than limiting description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM).

Those skilled in the art shall clearly understand that, for convenience and conciseness of the description, with respect to the specific operation processes of the apparatus and devices described above and the resulting technical effects, reference may be made to the respective processes and technical effects in the foregoing method embodiments, and details thereof will be omitted here.

According to several embodiments of the present disclosure, the system, apparatus and method disclosed may be implemented in any other ways.

For example, some features of the method embodiments described above may be omitted or not executed. The apparatus embodiments described above is merely exemplary.

For example, the divisions of units are only divisions based on logical functions, and there may be other divisions in actual implementations.

For example, more than one unit or component may be combined or integrated into another system. In addition, coupling between units or coupling between components may be direct coupling or indirect coupling. The above coupling includes electrical, mechanical, or other forms of connection.

It should be understood that, in various embodiments of the present disclosure, values of the sequence numbers of the above processes do not imply the order in which they are performed. The order in which each process is performed should be determined by its function and internal logic. The implementation processes according to embodiments of the present disclosure are not limited to any specific order described above.

In addition, the terms "system" and "network" are often used interchangeably in embodiments of the present disclosure. The term "and/or" as used herein only represents a relationship between relevant objects, including three relationships.

For example, "A and/or B" may mean A only, B only, or both A and B. In addition, the symbol "/" as used herein represents an "or" relationship between the relevant objects preceding and succeeding the symbol.

In summary, the above description merely illustrates embodiments of the technical solutions of the present disclosure, and is not intended to limit the scope of the present disclosure. Any modification, equivalent replacement, improvement, and the like made within the spirit and principle of the present disclosure shall be included in the scope of the present disclosure.

What is claimed is:

1. A method of communication, comprising:
   receiving first configuration information, wherein the first configuration information is used to configure one or more control resource sets (CORESETs), at least one of the one or more CORESETs is configured with a respective group index, and the one or more CORESETs do not comprise CORESET #0; and
   receiving, according to scheduling information transmitted on the one or more CORESETs and/or CORESET #0, a physical downlink shared channel (PDSCH) scheduled by the scheduling information;
   receiving first DCI on CORESET #0, wherein the first DCI is configured to schedule a first PDSCH; and
   in response that the first DCI meets a first preset condition, and that the first DCI and the first PDSCH correspond to the same component carrier (CC), receiving the first PDSCH according to a quasi co-location (QCL) assumption of a first CORESET,
   wherein the first preset condition indicates that a time interval between the first DCI and the first PDSCH is less than a first threshold, and
   wherein the method further comprises:
   receiving second DCI on CORESET #0, wherein the second DCI is configured to schedule a first channel state information-reference signal (CSI-RS); and
   in response that the second DCI meets a second preset condition, and that the second DCI and the first CSI-RS correspond to the same CC, receiving the first CSI-RS according to a TCI state or a QCL assumption of a second CORESET; or
   in response that the second DCI meets the second preset condition, and that the second DCI and the first CSI-RS correspond to different CCs, receiving the first CSI-RS according to a second TCI state or a second QCL assumption,
   wherein the second preset condition indicates that a time interval between the second DCI and the first CSI-RS is less than a first threshold or less than or equal to the first threshold.

2. The method according to claim 1, wherein
   the first CORESET is a CORESET with the smallest identifier (ID) among target CORESETs within the most recently detected downlink slot on a bandwidth part (BWP) corresponding to the first DCI, and
   the target CORESETs comprise CORESETs corresponding to a first group index, or the target CORESETs comprise the CORESETs corresponding to the first group index and/or CORESET #0,
   wherein the first group index is the smallest group index or the largest group index; or
   the first CORESET is a CORESET with the smallest ID among CORESETs within the most recently detected downlink slot on a respective BWP.

3. The method according to claim 1, wherein
   the second CORESET is a CORESET with the smallest ID among target CORESETs within the most recently detected downlink slot on a BWP corresponding to the second DCI, and
   the target CORESETs comprise CORESETs corresponding to a second group index, or the target CORESETs comprise the CORESETs corresponding to the second group index and CORESET #0,
   wherein the second group index is the smallest group index or the largest group index; or
   the second CORESET is a CORESET with the smallest ID among CORESETs within the most recently detected downlink slot on a respective BWP.

4. A terminal device, comprising: a transceiver, a processor and a memory, wherein the memory is configured to store a computer program, and the processor is configured to call and run the computer program stored in the memory and control the transceiver to perform operations of:
   receiving first configuration information, wherein the first configuration information is used to configure one or more control resource sets (CORESETs), at least one of the one or more CORESETs is configured with a respective group index, and the one or more CORESETs do not comprise CORESET #0; and
   receiving, according to scheduling information transmitted on the one or more CORESETs and/or CORESET #0, a physical downlink shared channel (PDSCH) scheduled by the scheduling information;
   receiving first DCI on CORESET #0, wherein the first DCI is configured to schedule a first PDSCH; and
   in response that the first DCI meets a first preset condition, and that the first DCI and the first PDSCH correspond to the same component carrier (CC), receiving the first PDSCH according to a quasi co-location (QCL) assumption of a first CORESET,
   wherein the first preset condition indicates that a time interval between the first DCI and the first PDSCH is less than a first threshold, and wherein the method further comprises:
receiving second DCI on CORESET #0, wherein the second DCI is configured to schedule a first channel state information-reference signal (CSI-RS); and
in response that the second DCI meets a second preset condition, and that the second DCI and the first CSI-RS correspond to the same CC, receiving the first CSI-RS according to a TCI state or a QCL assumption of a second CORESET; or
in response that the second DCI meets the second preset condition, and that the second DCI and the first CSI-RS correspond to different CCs, receiving the first CSI-RS according to a second TCI state or a second QCL assumption,
wherein the second preset condition indicates that a time interval between the second DCI and the first CSI-RS is less than a first threshold or less than or equal to the first threshold.

5. The terminal device according to claim 4, wherein
the first CORESET is a CORESET with the smallest identifier (ID) among target CORESETs within the most recently detected downlink slot on a bandwidth part (BWP) corresponding to the first DCI, and
the target CORESETs comprise CORESETs corresponding to a first group index, or the target CORESETs comprise the CORESETs corresponding to the first group index and/or CORESET #0,
wherein the first group index is the smallest group index or the largest group index; or
the first CORESET is a CORESET with the smallest ID among CORESETs within the most recently detected downlink slot on a respective BWP.

6. The terminal device according to claim 4, wherein
the second CORESET is a CORESET with the smallest ID among target CORESETs within the most recently detected downlink slot on a BWP corresponding to the second DCI, and
the target CORESETs comprise CORESETs corresponding to a second group index, or the target CORESETs comprise the CORESETs corresponding to the second group index and CORESET #0,
wherein the second group index is the smallest group index or the largest group index; or
the second CORESET is a CORESET with the smallest ID among CORESETs within the most recently detected downlink slot on a respective BWP.

7. The terminal device according to claim 4, wherein
the first threshold is reported by a terminal device;
the first threshold being reported by the terminal device means that the first threshold is reported by the terminal device through parameters of timeDurationForQCL and/or beamSwitchTiming; and
the parameters of timeDurationForQCL and/or beamSwitchTiming comprise first thresholds corresponding to different bands, or
the parameters of timeDurationForQCL and/or beamSwitchTiming comprise first thresholds corresponding to different band combinations.

8. The terminal device according to claim 4, wherein the processor is further configured to call and run the computer program stored in the memory and control the transceiver to perform operations of:
receiving third DCI on CORESET #0, wherein the third DCI is configured to schedule a second PDSCH, and a scrambling ID of the second PDSCH is one of at least one PDSCH scrambling ID configured by first RRC signaling.

9. The terminal device according to claim 8, wherein the first RRC signaling is dataScramblingIdentityPDSCH and/or AdditionalDataScramblingIdentityPDSCH,
wherein
the third DCI is in a DCI format 1-1, or
the third DCI is in a DCI format 1-0 transmitted in a user equipment (UE) specific search space.

10. The terminal device according to claim 4, wherein the processor is further configured to call and run the computer program stored in the memory and control the transceiver to perform operations of:
receiving sixth DCI on CORESET #0, wherein the sixth DCI is configured to schedule a third PDSCH; and
in response to receipt of the third PDSCH, performing rate matching according to a first cell reference signal (CRS) pattern set.

11. The terminal device according to claim 10, wherein
the first CRS pattern set comprises at least one CRS pattern corresponding to the smallest group index; or
the first CRS pattern set comprises all CRS patterns corresponding to a current BWP.

12. The terminal device according to claim 4, wherein
HARQ-ACK feedback information corresponding to data scheduled by DCI received on CORESET #0 corresponds to a first HARQ-ACK codebook; and
the first HARQ-ACK codebook is a HARQ-ACK codebook corresponding to the smallest group index.

13. The terminal device according to claim 4, wherein the terminal device is configured by a network device to use a semi-static HARQ-ACK codebook, and HARQ-ACK information bits are accordingly concatenated in the following order by operations of:
indexing in an ascending order across PDSCH reception occasion indexes of the same serving cell corresponding to the same group index;
indexing in an ascending order across serving cell indexes corresponding to the same group index; and
indexing in an ascending order across group indexes.

14. The terminal device according to claim 4,
wherein the terminal device is configured by a network device to use a dynamic HARQ-ACK codebook, and the method further comprises:
determining a physical uplink control channel (PUCCH) resource according to seventh DCI; and
wherein the seventh DCI is the last DCI among DCIs arranged in the following order by operations of:
indexing in an ascending order across group indexes corresponding to the DCIs in the same PDCCH monitoring occasion of the same serving cell;
indexing in an ascending order across serving cell indexes in the same PDCCH monitoring occasion; and
indexing in an ascending order across PDCCH monitoring occasion indexes.

15. The terminal device according to claim 13, wherein indexing is performed in an ascending order across the group indexes, and the smallest group index is used for indexing of PDSCH scheduled by DCI on CORESET #0.

16. The terminal device according to claim 4, wherein the processor is further configured to call and run the computer program stored in the memory and control the transceiver to perform an operation of:
in response that a UE specific search space is configured on CORESET #0, and that the number of blind detections or the number of control channel elements (CCEs) on target UE specific search spaces exceeds a second threshold, starting dropping according to indexes of the target UE specific search spaces from the largest index, until the second threshold is met;
wherein the target UE specific search spaces comprise: the UE specific search space corresponding to CORESET #0, and all the UE specific search spaces corresponding to a first group index;
wherein the first group index is the smallest group index; and
wherein the second threshold is determined based on a reported capability of a terminal device.

* * * * *